United States Patent [19]
Jones et al.

[11] Patent Number: 5,194,860
[45] Date of Patent: Mar. 16, 1993

[54] RADIO TELEMETRY SYSTEMS WITH CHANNEL SELECTION

[75] Inventors: Alan J. Jones, Newcastle; Andrew H. J. Larkins, Harrow; Trevor W. Booth, Crawley; Frederick M. Clayton, Leighton Buzzard; Gary J. Marshall, Harrow, all of United Kingdom

[73] Assignee: The General Electric Company, p.l.c., England

[21] Appl. No.: 613,319

[22] Filed: Nov. 15, 1990

[30] Foreign Application Priority Data

Nov. 16, 1989 [GB] United Kingdom ............... 8925907

[51] Int. Cl.$^5$ .............................................. G08C 17/00
[52] U.S. Cl. ......................... 340/370.02; 340/870.03; 340/870.28; 340/825.54; 455/54.1; 455/67.1
[58] Field of Search ............... 340/870.02, 870.03, 340/870.28, 870.11, 825.54, 825.1; 455/53.1, 54.1, 58.1, 166.2, 31, 34, 88, 67.1

[56] References Cited

U.S. PATENT DOCUMENTS

| 4,197,500 | 4/1980 | Klein et al. ............... 455/62 |
| 4,293,954 | 10/1981 | Villatte ..................... 455/54 |
| 4,309,773 | 1/1982 | Johnson et al. .......... 455/67 X |
| 4,614,945 | 9/1986 | Beunivs et al. .......... 340/505 X |

FOREIGN PATENT DOCUMENTS 0189920 8/1986 European Pat. Off.
0245606 11/1987 European Pat. Off.

OTHER PUBLICATIONS

IEEE Transactions on Power Delivery, vol. PRWD2, No. 3, Jul. 1987, New York, US, pp. 671-676; J.Tl Lancaster et al, "Semi-Automatic Meter Reading".

*Primary Examiner*—Donald J. Yusko
*Assistant Examiner*—Michael Horabik
*Attorney, Agent, or Firm*—Kirschstein, Ottinger, Israel & Schiffmiller

[57] ABSTRACT

A radio telemetry system for collecting the readings of consumer's electricity consumption meters includes a master station (1) carried by a vehicle (1) and a plurality of transponders (3), each of which holds an electrical quantity indicative of an amount of electrical power consumed as measured by the meter associated with that transponder (3). The transponders (3) and the master station (1) communicate such that the transponders (3) transmit to the master station (1) signals containing information as to the values of the aforesaid electrical quantities held by them. Such communication takes place on a relatively quiet channel, of a number of channels, as determined by the master station (1) such that the system is capable of operating satisfactorily when the master station (1) and the transponders (3) utilise relatively low power transmitters 7, 19).

12 Claims, 2 Drawing Sheets

RADIO TELEMETRY SYSTEMS WITH CHANNEL SELECTION

BACKGROUND OF THE INVENTION

This invention relates to radio telemetry systems.

More particular the invention relates to radio telemetry systems of the kind comprising a master station and a plurality of transponders which the master station interrogates so that data held by the transponders can be collected by the master station. Such a system finds application, for example, in collecting the readings of meters measuring the supply of a commodity, e.g. gas, water or electricity, to consumers.

SUMMARY OF THE INVENTION

It is an object of the present invention to provide such a radio telemetry system which is capable of operating satisfactorily when the master station and transponders utilise relatively low power transmitters.

According to the present invention there is provided a radio telemetry system comprising: a master station; and a plurality of transponders, each transponder having a stand-by state in which it listens on each of a number of channels in turn, the master station listening on each of said number of channels in turn to establish a relatively quiet channel and then transmitting a wake-up signal on said relatively quiet channel, each transponder responding to receipt of a said wake-up signal by transmitting an acknowledgement signal on said relatively quiet channel, the master station responding to receipt of an acknowledgement signal to receive data from the corresponding transponder, thereafter that transponder ignoring further wake-up signals for a predetermined time, and then transmitting a further wake-up signal.

BRIEF DESCRIPTION OF THE DRAWINGS

One system in accordance with the present invention will now be described, by way of example, with reference to the accompanying drawings in which.

DETAILED DESCRIPTION OF THE PREFERRED EMBODIMENT

Figure 1:
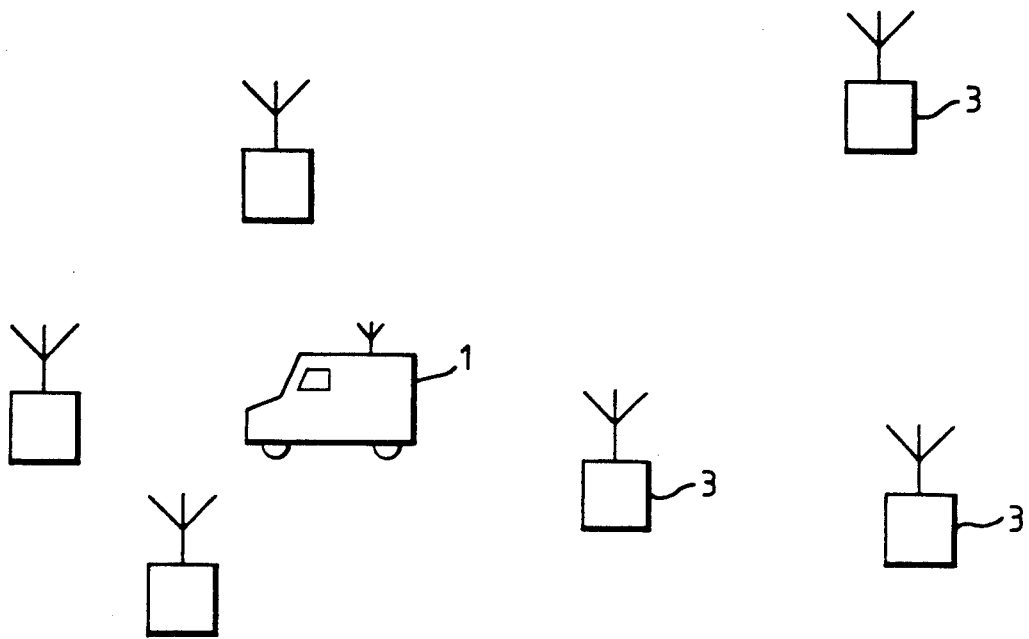
FIG. 1 is a diagrammatic illustration of the system.

Referring to FIG. 1, the system comprises a master station carried by a road vehicle 1 and a plurality of stationary transponders 3. Each transponder 3 is associated with a respective consumer's electricity meter (not shown) and holds an electrical quantity indicative of the amount of electrical energy consumed as measured by the associated meter. The master station 1 is mobile so that it can progressively position itself within radio range of different groups of the transponders 3 for communication with them to obtain an indication of the electrical quantities held by them and thus remotely read their associated meters.

Figure 2:
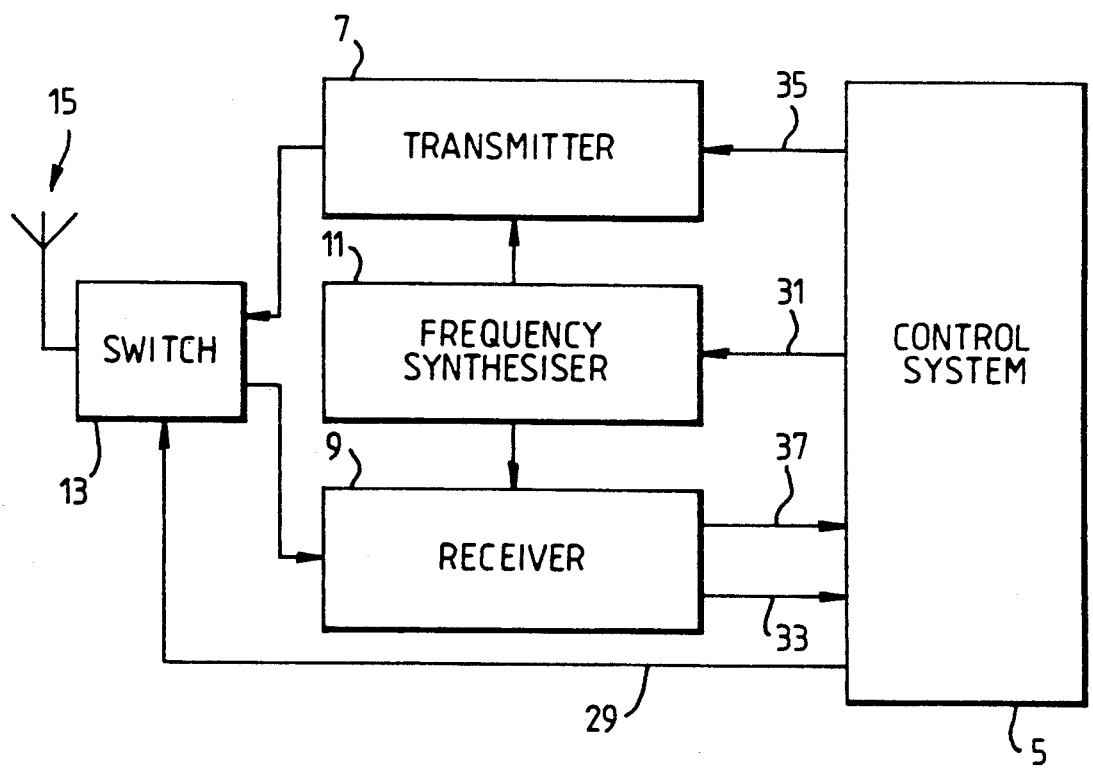
FIG. 2 is a block schematic diagram of a master station of the system.

Referring to FIG. 2, the master station 1 comprises a control system 5, a transmitter 7, a receiver 9, a frequency synthesiser 11 which sets the operating frequency of the transmitter 7 and the receiver 9, a switch 13 and an antenna 15, connected as shown in FIG. 2.

Figure 3:
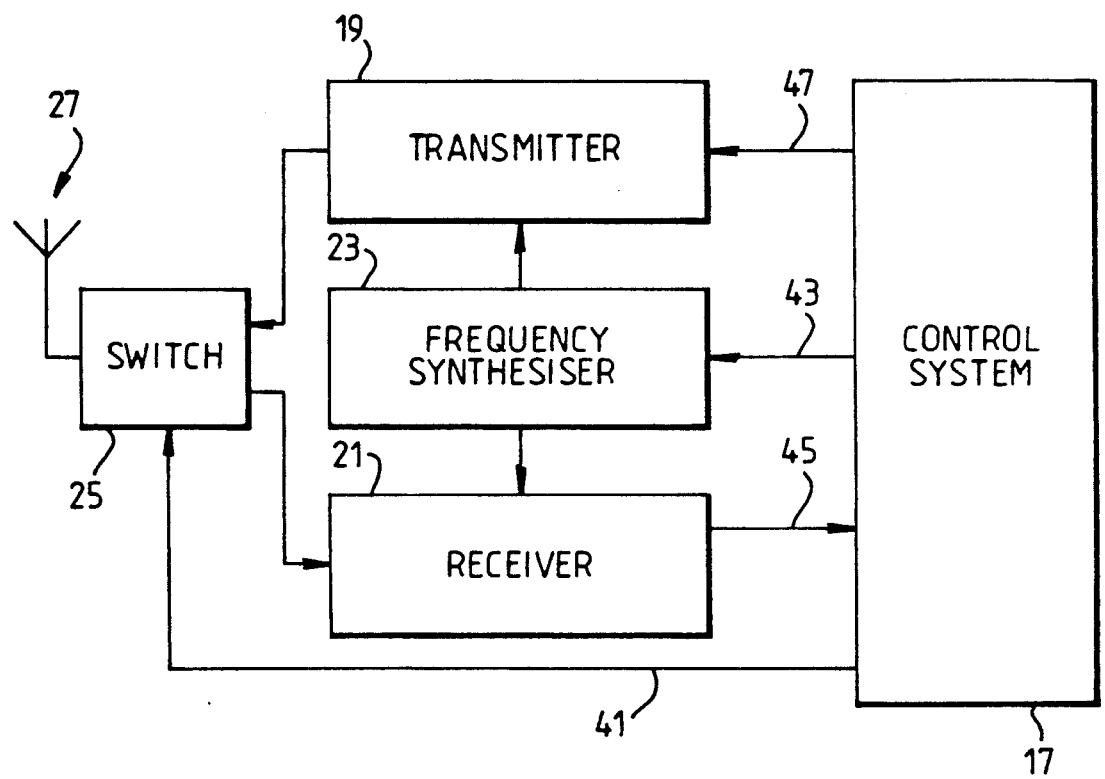
FIG. 3 is a block schematic diagram of a transponder of the system.

Referring to FIG. 3, each transponder 3 similarly comprises a control system 17, a transmitter 19, a receiver 21, a frequency synthesiser 23 which sets the operating frequency of the transmitter 19 and the receiver 21, a switch 25 and an antenna 27, connected as shown in FIG. 3.

The operation of the system is as follows.

The master station 1 and transponders 3 can each receive and transmit radio signals on any of the thirty-nine radio channels of the 888 to 889 MHz telemetry band (Department of Trade and Industry specification MPT 1341).

In stand-by mode each transponder 3 listens for a predetermined time on each of the thirty-nine channels of the 888 to 889 MHz telemetry band in turn.

More specifically, in each transponder 3 the control system 17 instructs the switch 25 via a connection 41 to connect the antenna 27 to the receiver 21, and instructs the frequency synthesiser 23 via a connection 43 to step the receiver operating frequency through the thirty-nine channel frequencies of the 888 to 889 MHz telemetry band, remaining at each channel frequency for the required predetermined time.

In order to minimise the number of transponders 3 listening on any one channel at a given time, the frequency synthesisers 23 of the transponders 3 step randomly through the frequencies of the thirty-nine channels.

When the mobile master station 1 has positioned itself within radio range of a group of the transponders 3, it determines which of the thirty-nine channels of the 888–889 MHz telemetry band is the quietest, i.e. which channel of the band is being used the least by other users of the band. It then uses this quietest channel to attempt to communicate with the transponders 3.

More specifically, once the master station 1 is within radio range of the transponders 3, its control system 5 instructs the switch 13 by way of a connection 29 to connect the receiver 9 to the antenna 15 and instructs the frequency synthesiser 11 by way of a connection 31 to step the receiver operating frequency in increasing order once through the channel frequencies of the 888–889 MHz band, remaining at each frequency in the range for a preselected time. In respect of each channel a signal representative of the strength of the signal received by the receiver 9 is passed, by way of a connection 33, to the control system 5 which determines the channel Q on which the weakest signal has been received, i.e. determines the quietest channel Q.

The control system 5 of the master station 1 then instructs the switch 13 to connect the antenna 15 to the transmitter 7, causes the synthesiser 11 to set the transmitter operating frequency at the frequency of channel Q, and, via a connection 35, causes the transmitter 7 to transmit on channel Q a general wake-up signal to the transponders 3. Having transmitted the general wake-up signal the master station 1 then listens on channel Q.

As explained above, of the transponders 3 in radio range of the master station only a small fraction will be listening on channel Q at the time the master station 1 transmits the wake-up signal, and will thus receive the wake-up signal. Each of the receivers 21 of the transponders 3 that do receive the wake-up signal passes it via a connection 45 to the control system 17 which in response thereto: instructs the switch 25 to connect the antenna 27 to the transmitter 19; causes the synthesiser 25 to set the transmitter operating frequency of channel Q; and, via a connection 47, causes the transmitter 19 to transmit on channel Q an acknowledgement signal containing an address code unique to that transponder 3.

The transponders 3 that have transmitted acknowledgement signals then listen for a defined period of time on channel Q. At the end of this defined period each transponder reverts to its initial state, i.e. the state in which it is listening for a perdetermined time on each of the thirty-nine channels in turn, unless within the defined period it has received from the master station 1 a signal containing its unique address code, as described below.

The receiver 9 of the master station 1 receives on channel Q the strongest of the acknowledgement signals transmitted by the transponders 3 and passes the unique address code contained in that signal by way of a connection 37 to the control system 5. In response to receiving the unique address code of a transponder 3, the control system 5 causes the transmitter 7 to transmit on channel Q a signal containing that unique address code. Having done this the master station 1 returns again to listening on channel Q.

All the transponders 3 that responded to the wake-up call will be listening at this time on channel Q and therefore receive this signal from the master station 1, but the control system 17 of one transponder only will recognise this signal as containing its own unique address code. In response to such recognition, the control system 17 of that transponder causes that transponder to transmit to the master station on channel Q a signal containing data representing the electrical quantity held by it corresponding to an amount of electrical energy consumed as measured by the associated consumer's electricity meter. The receiver 9 of the master station 1 passes this information via the connection 37 to the control system 5 of the master station 1 where it is placed in memory as the reading for that meter.

The master station 1 then transmits on channel Q to the relevant transponder 3 a signal instructing it to go to sleep for a time, so that it does not interfere with subsequent attempts by the master station 1 to communicate with other transponders 3 and hence read their associated meters.

Such communication with the other transponders 3 takes place as described above, i.e. beginning with the transmission by the master station 1 of a general wake-up signal on channel Q and the response of all transponders 3 that are in radio range and are listening on channel Q at the time the wake-up signal is transmitted.

In the instance where there is a failure to communicate on channel Q, the master station 1 transmits the wake-up call on the second, and if this fails, the third quietest channel as already determined. If communication is still not achieved the master station 1 re-determines which of the thirty-nine channels is the quietest channel and then recommences the above strategy. Re-determination of the quietest channel may also be made after a fixed time has passed since the preceding determination.

The master station will repeat wake-up calls on a particular channel several times before changing to another channel, since failure to communicate with any transponder may be due to no transponders listening on the relevant channel. This situation can arise when only few transponders are in radio range and are not asleep.

It will be appreciated that satisfactory operation of the system requires the master station to be able to pick out from the acknowledgement signals sent by the transponders in response to a wake-up call, one particular acknowledgement signal. Whilst this presents no problem where one acknowledgement signal is stronger than the others, where a relatively large number of transponder units are in radio range of the master station, interference between acknowledgement signals may prevent the master station from satisfactorily receiving any acknowledgement signal.

This problem may be alleviated by reducing the power with which the master station transmits the general wake-up signal so that fewer transponders are within radio range of the master station. Alternatively it may be alleviated by the master station instructing the transponders within radio range to go to sleep for short random lengths of time so that they go to sleep for short different lengths of time. This reduces the potential number of replies to the next wake-up call and therefore reduces the probability of interference. The problem may also be alleviated by arranging for the transponders to listen in the stand-by mode non-continuously so that at any time only a fraction of the transponders within radio range of the master station can respond to a wake-up call. This problem can of course also be alleviated by the transponders using a form of modulation that minimises the probability of co-channel interference.

It will be appreciated that this interference problem arises especially when the master station first starts transmitting in a new locality. Re-occurrence of the problem when all transponders within radio range have been interrogated can be avoided by the master station then moving its position only slightly so that when the next wake-up call is made only relatively few transponders are in radio range and not asleep.

It will be understood that the master station will normally be arranged to be capable of communicating with any desired particular transponder by transmitting a specific wake-up signal rather than a general wake-up signal.

Similarly, the system may be arranged so that data can be passed from the master station to the transponders if desired for example, for setting the operating times of dual tariff electricity meters.

We claim:

1. A radio telemetry system comprising: a master station; and a plurality of transponders, each transponder having a stand-by state in which it listens on each of a number of channels in turn, the master station listening on each of said number of channels in turn to establish a relatively quiet channel and then transmitting a wake-up signal on said relatively quiet channel, each tranponder listening on said relatively quiet channel at the time the master station transmits said wake-up signal responding to receipt of said wake-up signal by transmitting an acknowledgement signal on said relatively quiet channel, the master station responding to receipt of one of the acknowledgement signals transmitted to receive data from the transponder which transmitted that one acknowledgement signal, thereafter that transponder ignoring further wake-up signals for a predetermined time, and the master station transmits a further wake-up signal after receipt of data from the transponder which transmitted said one acknowledgement signal.

2. A system according to claim 1 wherein said master station instructs said transponder which transmitted said one acknowledgement signal to ignore said further wake-up signals.

3. A system according to claim 1 wherein said relatively quiet channel is the quietest channel.

4. A system according to claim 3 wherein, if said master station fails to receive an acknowledgement signal in response to its transmitting a wake-up signal, the master station transmits a wake-up signal on the second quietest channel.

5. A system according to claim 1 wherein, if said master station fails to receive an acknowledgement signal in response to its transmitting a wake-up signal, the master station listens again on each of said number of channels in turn to establish a relatively quiet channel and transmits a wake-up signal on this relatively quiet channel.

6. A system according to claim 1 wherein, if the master station fails to receive an acknowledgement signal in response to its transmitting a wake-up signal, the master station reduces the power with which it transmits the wake-up signal.

7. A system according to claim 1 wherein, if the master station fails to receive an acknowledgement signal in response to its transmitting a wake-up signal, the master station instructs the transponders within radio range to go to sleep for short random lengths of time.

8. A system according to claim 1 wherein each transponder listens in the standby state non-continuously.

9. A system according to claim 1 wherein said master station is carried by a vehicle; and, once all the transponders within radio range are ignoring further wake-up signals for a predetermined time, the vehicle moves the master station's position so that only relatively few transponders are in radio range and not ignoring wake-up signals.

10. A system according to claim 1 wherein the data received from each transponder represents a quantity determined by monitoring means associated with that transponder.

11. A system according to claim 10 wherein the quantity is the amount of a commodity supplied to a consumer.

12. A system according to claim 11 wherein said commodity is electrical energy, each monitoring means comprising a respective consumer's electricity consumption meter.

* * * * *